(12) United States Patent
Khan et al.

(10) Patent No.: US 12,007,982 B2
(45) Date of Patent: Jun. 11, 2024

(54) METHOD AND SYSTEM FOR IDENTIFYING AND DELETING RECORDS ON HOSTS

(71) Applicant: EMC IP Holding Company LLC, Hopkinton, MA (US)

(72) Inventors: Asif Khan, Bangalore (IN); Kenneth William Owens, Burlington (CA); Adrian Dobrean, Oakville (CA); Aneesh Kumar Gurindapalli, Vijayawada (CA); Vipin Kumar Kaushal, Bangalore (IN); Yasemin Ugur-Ozekinci, Oakville (CA); Shelesh Chopra, Bangalore (IN); Gowtham Krishna Iyengar Srinivasa Rangan, Mysore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 289 days.

(21) Appl. No.: 17/160,353

(22) Filed: Jan. 27, 2021

(65) Prior Publication Data

US 2022/0237177 A1 Jul. 28, 2022

(51) Int. Cl.
*G06F 16/23* (2019.01)
(52) U.S. Cl.
CPC ...... *G06F 16/2379* (2019.01); *G06F 16/2358* (2019.01)
(58) Field of Classification Search
CPC .............. G06F 16/2379; G06F 16/2358
See application file for complete search history.

(56) References Cited

U.S. PATENT DOCUMENTS

| | | | | |
|---|---|---|---|---|
| 10,007,739 | B1* | 6/2018 | Gundersen | G06F 16/90344 |
| 2014/0181047 | A1* | 6/2014 | Pawar | G06F 16/162 |
| | | | | 707/654 |
| 2018/0357235 | A1* | 12/2018 | Hallgren | G06F 16/2365 |
| 2021/0026973 | A1* | 1/2021 | de Freitas Cunha | H04W 12/33 |
| 2022/0035556 | A1* | 2/2022 | Cashman | G06F 12/10 |
| 2022/0100728 | A1* | 3/2022 | Shah | G06F 9/546 |
| 2022/0114163 | A1* | 4/2022 | Seetharaman | G06F 16/2379 |
| 2022/0188439 | A1* | 6/2022 | Drapeau | G06F 21/6245 |

\* cited by examiner

*Primary Examiner* — Mark D Featherstone
*Assistant Examiner* — Lahcen Ennaji
(74) *Attorney, Agent, or Firm* — Chamberlain, Hrdlicka, White, Williams & Aughtry; Aly Z. Dossa

(57) ABSTRACT

A system for identifying and deleting records of hosts includes a local data manager. The local data manager identifies a discovery event associated with the host and a record type of record types, obtains, in response to identifying, all previously discovered records on the host associated with the record type from a host record repository, obtains discovered records associated with the record type and associated with the host, after obtaining all discovered records and previously discovered records, selects a previously discovered record of the previously discovered records, makes a determination that the previously discovered record does not match any discovered records of the discovered records and is not tagged with a soft delete tag or a hard delete tag, and in response to the determination, tags the previously discovered record with a soft delete tag, and notifies a data manager of modifications to the previously discovered records.

10 Claims, 14 Drawing Sheets

METHOD AND SYSTEM FOR IDENTIFYING AND DELETING RECORDS ON HOSTS

BACKGROUND

Devices may generate information based on existing information. For example, devices may obtain information and derive information based on the obtained information. To obtain information, devices may be able to communicate with other devices. The communications between devices may be through any means.

SUMMARY

In one aspect, a system for identifying and deleting records of hosts in accordance with one or more embodiments of the invention includes local data manager persistent storage and a local data manager. The local data manager identifies a discovery event associated with the host and a record type of record types; obtains, in response to identifying, all previously discovered records on the host associated with the record type from a host record repository; obtains discovered records associated with the record type and associated with the host; after obtaining all discovered records and previously discovered records: selects a first previously discovered record of the previously discovered records; makes a first determination that the first previously discovered record does not match any discovered records of the discovered records and is not tagged with a soft delete tag or a hard delete tag; and in response to the first determination: tags the first previously discovered record with a soft delete tag; and notifies a data manager of modifications to the previously discovered records.

In one aspect, a method for identifying and deleting records of hosts in accordance with one or more embodiments of the invention includes identifying a discovery event associated with the host and a record type of record types; obtaining, in response to identifying, all previously discovered records on the host associated with the record type from a host record repository; obtaining discovered records associated with the record type and associated with the host; after obtaining all discovered records and previously discovered records: selecting a first previously discovered record of the previously discovered records; making a first determination that the first previously discovered record does not match any discovered records of the discovered records and is not tagged with a soft delete tag or a hard delete tag; and in response to the first determination: tagging the first previously discovered record with a soft delete tag; and notifying a data manager of modifications to the previously discovered records.

In one aspect, a non-transitory computer readable medium in accordance with one or more embodiments of the invention includes computer readable program code, which when executed by a computer processor enables the computer processor to perform a method for identifying and deleting records of hosts in accordance with one or more embodiments of the invention. The method includes identifying a discovery event associated with the host and a record type of record types; obtaining, in response to identifying, all previously discovered records on the host associated with the record type from a host record repository; obtaining discovered records associated with the record type and associated with the host; after obtaining all discovered records and previously discovered records: selecting a first previously discovered record of the previously discovered records; making a first determination that the first previously discovered record does not match any discovered records of the discovered records and is not tagged with a soft delete tag or a hard delete tag; and in response to the first determination: tagging the first previously discovered record with a soft delete tag; and notifying a data manager of modifications to the previously discovered records.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
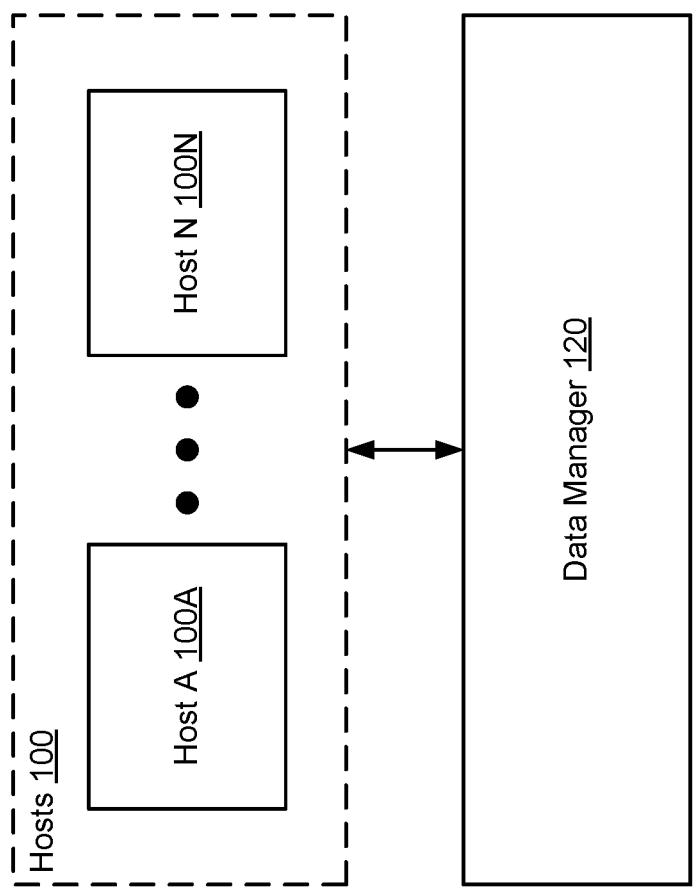
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a system and method for identifying and managing deleted records on hosts. More specifically, embodiments of the invention relate to tagging previously discovered records of various types of a host record repository that are not included in discovered records with soft delete tags and hard delete tags prior to deleting the previously discovered records from the host record repository. A previously discovered record tagged with a soft delete tag may be tagged with a hard delete tag after a configurable amount of time, and a previously discovered record tagged with a hard delete tag may be deleted from the host record repository after a configurable amount of time. Additionally, previously discovered records with soft delete tags and hard delete tags may be resurrected if the record is included in newly discovered records prior to deletion. This may improve the efficiency of managing records of hosts and may prevent accidental data loss.

FIG. 1A shows a diagram of a system in accordance with one or more embodiments of the invention. The system may include hosts (100) and a data manager (120). The system may include one or more hosts (100), e.g., host A (100A) and host N (100N). The system may include additional, fewer, and/or different components without departing from the invention. Each component may be operably connected to any of the other components via any combination of wired and/or wireless connections. Each of the aforementioned components is discussed below.

In one or more embodiments of the invention, the hosts (100) provide services to clients (not shown) and generate data. The data may be of value to users of the hosts (100) and may therefore require data protection services to be provided to the data. The hosts (100) may obtain data protection management services from the data manager (120). To obtain the data protection management services, the hosts (100) may (i) obtain generic data protection requests from the data manager (120), (ii) provide the data manager (120) with information associated with host components (discussed below), and (iii) notify the data manager (120) when host components are added or removed from the hosts (100). The hosts (100) may also obtain backup storage services from the backup storage (130). The hosts (100) may include any number of hosts (e.g., 100A, 100N) without departing from the invention. The hosts may provide and/or obtain other and/or additional services, and/or include other and/or additional functionalities without departing from the invention. For additional information regarding the hosts (100), refer to FIG. 1B.

Figure 7:
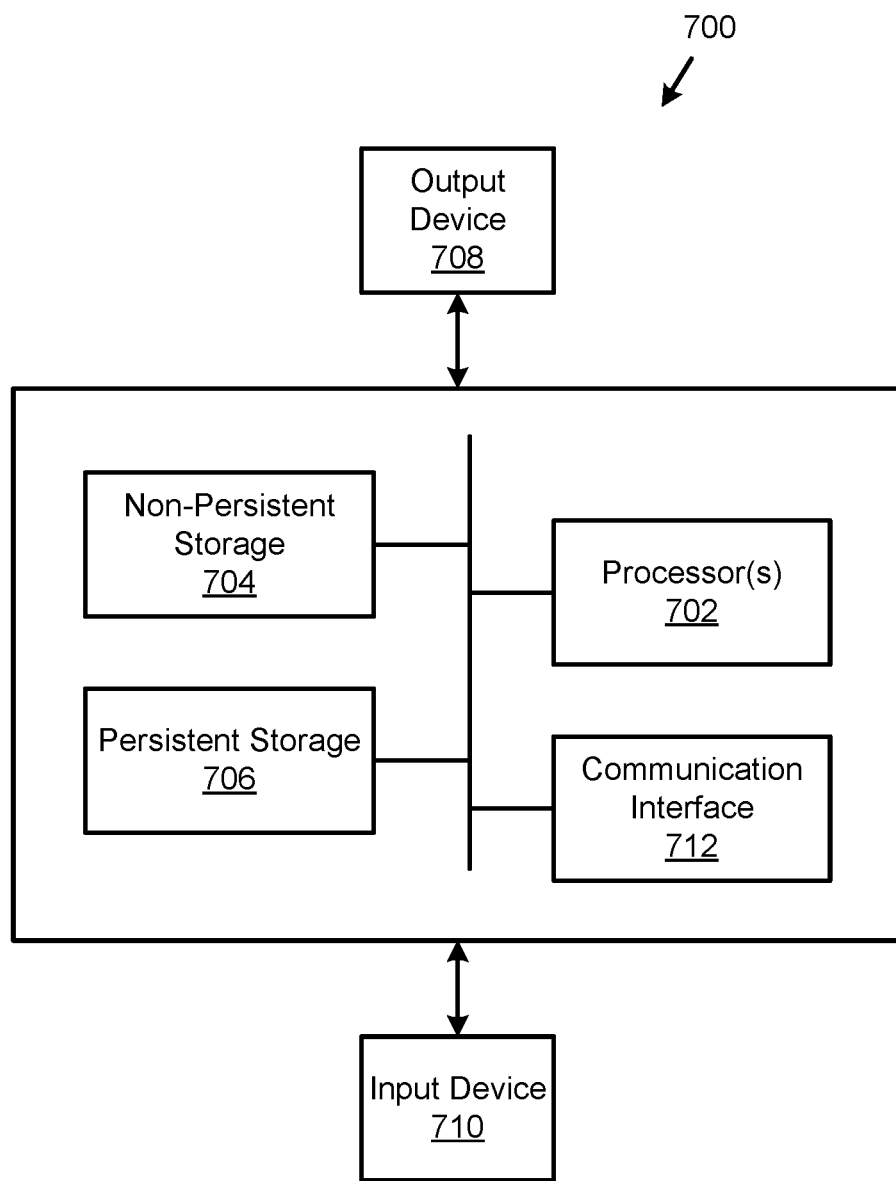
FIG. 7 shows a diagram of a computing device in accordance with one or more embodiments of the invention.

In one or more embodiments of the invention, each of the hosts (100) is implemented as a computing device (see e.g., FIG. 7). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of a host (e.g., 100A) described throughout this application.

In one or more embodiments of the invention, each of the hosts (100) is implemented as a logical device. The logical device may utilize the computing resources of any number of computing devices and thereby provide the functionality of the hosts (100) described throughout this application.

In one or more embodiments of the invention, the data manager (120) includes the functionality to provide data management services to the hosts (100). The data management services may include generating managing records associated with hosts (100), generating backups of data generated on the hosts (100), and other and/or additional services without departing from then invention. The data manager (120) may include other and/or additional functionalities without departing from the invention. For additional information regarding the data manager (120), refer to FIG. 1C.

In one or more embodiments of the invention, the data manager (120) is implemented as a computing device (see e.g., FIG. 7). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data manager (120) described throughout this application.

In one or more embodiments of the invention, the data manager (120) is implemented as a logical device. The logical device may utilize the computing resources of any number of computing devices and thereby provide the functionality of the data manager (120) described throughout this application.

Figure 1B:
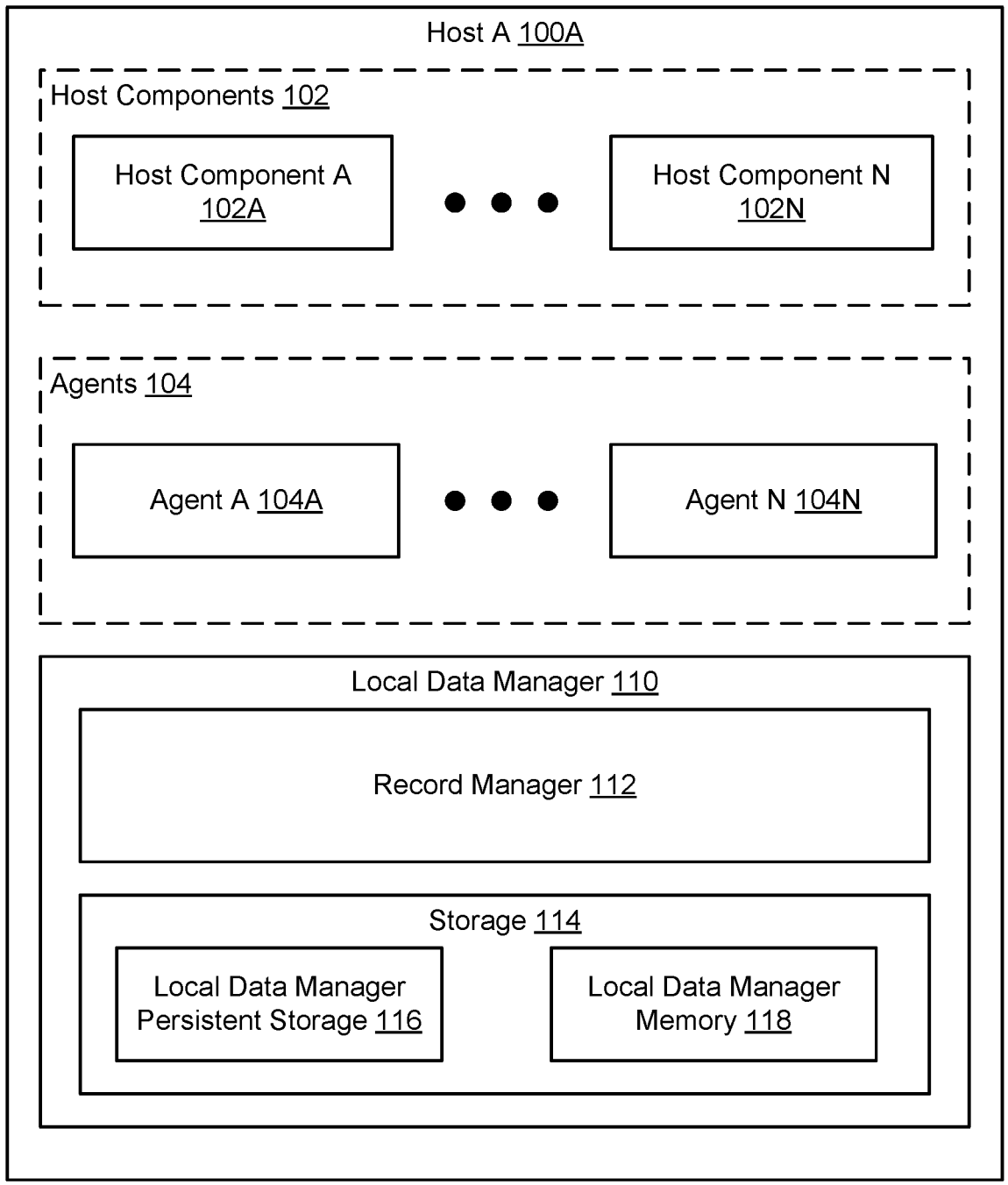
FIG. 1B shows a diagram of a host in accordance with one or more embodiments of the invention.

FIG. 1B shows a diagram of a host in accordance with one or more embodiments of the invention. Host A (100A) may be an embodiment of a host of the hosts (100, FIG. 1A) discussed above. As discussed above, host A (100A) provides services to clients (not shown). Host A (100A) may include host components (102), agents (104), and a local data manager (110). Host A (100A) may include additional, fewer, and/or different components without departing from the invention. Each of the aforementioned components is discussed below.

In one or more embodiments of the invention, host components (102) perform services for clients (not shown). Host A (100A) may host one or more host components (102). There may be any number of host components (102) included on host A (100A) (e.g., host component A (102A) and host component N (102N)) without departing from the invention. The services may include writing, reading, and/or otherwise modifying data stored in host A (100A). The host components (102) may include the functionality to read and write data to host A (100A). The host components (102) may include other unique functionalities that may differ from one host component (e.g., 102A) to the other (e.g., 102N). These unique functionalities may include compatible backup generation techniques, host component topologies, and other and/or additional unique functionalities without departing from the invention. Therefore, host components (102) may require specific and unique data protection services that may differ from between the host components (102). The host components may be, for example, database applications, email applications, file systems, and/or other and/or additional types of host components without departing from the invention. Host components may be added (i.e., installed) and removed (i.e., deleted) from host A (100A) by users of the system without departing from the invention. The host components (102) may include other and/or additional functionalities without departing from the invention.

The host components (102) may be implemented as computer instructions e.g., computer code, stored on a persistent storage of host A (100A) that when executed by a processor(s) of host A (100A), cause host A (100A) to provide the functionality of the host components (102) described throughout this application.

In one or more embodiments of the invention, the agents (104) provide data protection services to the host components (102). The data protection services may include (i) generating and/or obtaining host component metadata and records associated with host components, host component assets, backups, and the agents, (ii) obtaining data protection requests (discussed below), (iii) generating backups of data generated by the host components (102) (iv) providing and obtaining backups to and from the backup storage (130, FIG. 1A), and (v) restoring host components (102) using previously generated backups. Host A (100A) may include any number of agents (e.g., agent A (104A) and agent N (104N)). Each agent (e.g., 104A) may be associated with a particular host component (e.g., 102A), where the agent (e.g., 104A) provides data protection services for that particular host component (e.g., 102A). Each agent (e.g., 104A) may provide specific data protection services that may be different or performed in a different manner compared to that of other agents (e.g., 104N) based on the unique functionalities of the host component (e.g., 102A) to which they are associated. The agents (104) may include other and/or additional functionalities without departing from the invention.

In one or more embodiments of the invention, the agents (104) are physical devices. The physical devices may include circuitry. The physical devices may be, for example, a field-programmable gate array, application specific integrated circuit, programmable processor, microcontroller, digital signal processor, or other hardware processor. The physical devices may be programmed to provide the functionality of the agents (104) described throughout this application.

In one or more embodiments of the invention, the agents (104) are implemented as computer instructions, e.g., computer code, stored on a persistent storage that when executed by a processor of host A (100A) causes host A (100A) to provide the functionality of the agents (104) described throughout this application.

In one or more embodiments of the invention, the local data manager (110) includes the functionality to provide local data protection management services to host A (100A). The local data protection management services may include (i) identifying changes to records of host A (100A), and (ii) notifying the data manager (120, FIG. 1A) of the performance of the changes of the records. The local data manager (110) may include other and/or additional functionalities without departing from the invention. The local data manager (110) may include the functionality to perform the methods of FIGS. 3A-3C without departing from the invention.

In one or more embodiments of the invention, the local data manager (110) is a physical device. The physical device may include circuitry. The physical device may be, for example, a field-programmable gate array, application specific integrated circuit, programmable processor, microcontroller, digital signal processor, or other hardware processor. The physical device may be programmed to provide the functionality of the local data manager (110) described throughout this application.

In one or more embodiments of the invention, the local data manager (110) is implemented as computer instructions, e.g., computer code, stored on a persistent storage that when executed by a processor of host A (100A) causes host A (100A) to provide the functionality of the local data manager (110) described throughout this application.

In one or more embodiments of the invention, the local data manager (110) includes a record manager (112) and storage (114). The local data manager (110) may include other and/or additional components without departing from the invention. Each of the aforementioned components is discussed below.

In one or more embodiments of the invention, the local data manager (110) uses the record manager (112) to generate, obtain, and/or manage records associated with host A (100A). The record manager (112) may also maintain a host A record repository (discussed below in FIG. 2) stored in the local data manager persistent storage (116) of the storage (114). The record manager (112) may include other and/or additional functionalities without departing from the invention.

In one or more embodiments of the invention, the record manager (112) is a physical device. The physical device may include circuitry. The physical device may be, for example, a field-programmable gate array, application specific integrated circuit, programmable processor, microcontroller, digital signal processor, or other hardware processor. The physical device may be programmed to provide the functionality of the record manager (112) described throughout this application.

In one or more embodiments of the invention, the record manager (112) is implemented as computer instructions, e.g., computer code, stored on a persistent storage that when executed by a processor of host A (100A) causes host A (100A) to provide the functionality of the record manager (112) described throughout this application.

In one or more embodiments of the invention, the storage (114) stores data. The storage (114) may include local data manager persistent storage (116) where the host A record repository is stored in non-volatile storage, and local data manager memory (118) in which the local data manager (110) stores records used during the performance of record management services in volatile storage. For additional information regarding the local data manager persistent storage (116), refer to FIG. 2.

The storage (114) may be implemented using any combination of physical storage devices and/or logical storage devices. The physical storage devices may include any combination of hard disk drives, solid state disk drives, tape drives, random access memory, caches, and/or any other physical storage mediums for the storage of data.

The logical storage devices (e.g., virtualized storage) may utilize any quantity of hardware storage resources of any number of computing devices for storing data. For example, the storage (114) may utilize portions of any combination of hard disk drives, solid state disk drives, tape drives, random access memory, caches, and/or any other physical storage medium of any number of computing devices.

Figure 1C:
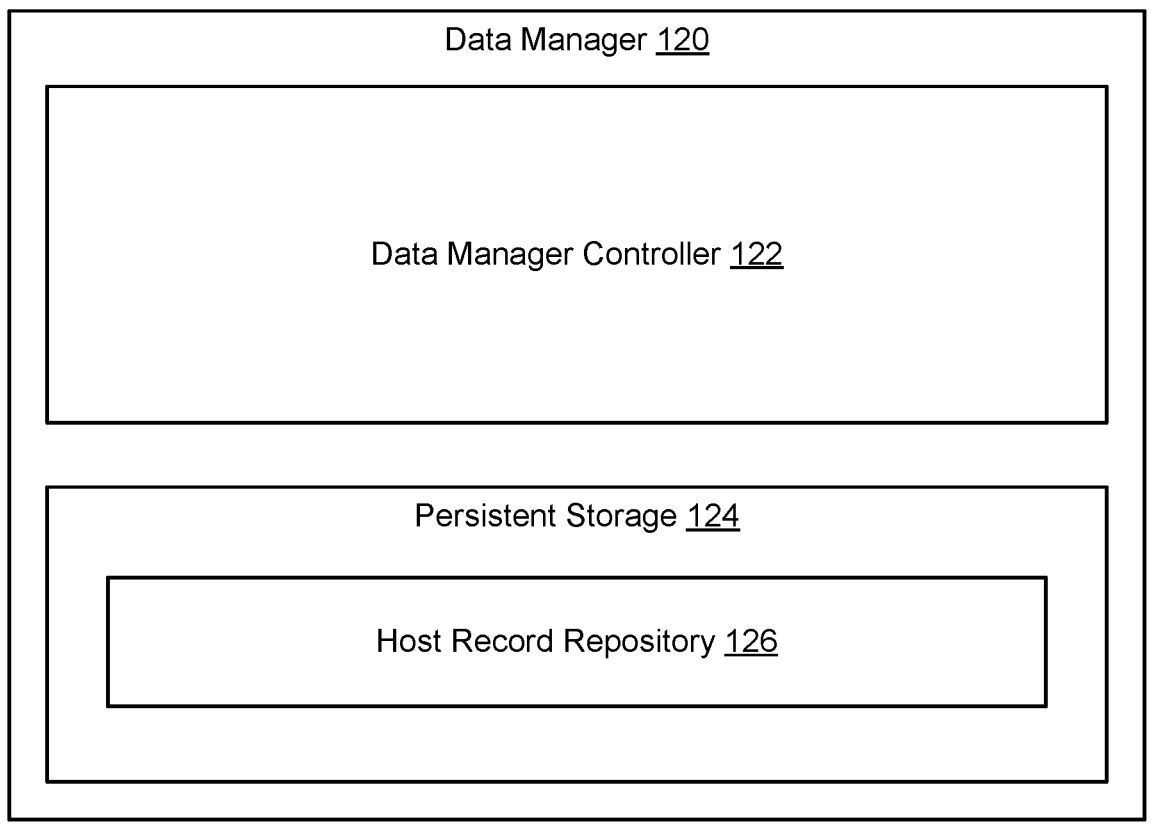
FIG. 1C shows a diagram of data manager in accordance with one or more embodiments of the invention.

FIG. 1C shows a diagram of data manager in accordance with one or more embodiments of the invention. The data manager (120) may be an embodiment of the data manager (120, FIG. 1A) discussed above. As discussed above, the data manager (120) provides data protection management services to the hosts (100, FIG. 1A). The data manager (120) may include a data manager controller (122) and persistent storage (124). The data manager (120) may include additional, fewer, and/or different components without departing from the invention. Each of the aforementioned components is discussed below.

In one or more embodiments of the invention, the data manager controller (122) includes the functionality to perform the data protection management services provided by the data manager (120). The data protection management services may include (i) generating backups of data generated on the hosts (100, FIG. 1A). The data manager controller (122) may also request local data managers (e.g., 110, FIG. 1B) to perform record management services, see e.g., FIGS. 3A-3C. The data manager controller (122) may include other and/or additional functionalities without departing from the invention.

In one or more embodiments of the invention, the data manager controller (122) is a physical device. The physical device may include circuitry. The physical device may be, for example, a field-programmable gate array, application specific integrated circuit, programmable processor, microcontroller, digital signal processor, or other hardware processor. The physical device may be programmed to provide the functionality of the data manager controller (122) described throughout this application.

In one or more embodiments of the invention, the data manager controller (122) is implemented as computer instructions, e.g., computer code, stored on a persistent storage that when executed by a processor of the data manager (120) causes the data manager (120) to provide the functionality of the data manager controller (122) described throughout this application.

In one or more embodiments of the invention, the persistent storage (124) stores data. The persistent storage (124) may include a host record repository (126). The persistent storage (124) may include other and/or additional data without departing from the invention. Each of these data structures is discussed below.

In one or more embodiments of the invention, the host record repository (126) is one or more data structures that includes host entries associated with the hosts (100, FIG. 1A). Each host entry may be an embodiment of the host A record repository (200, FIG. 2, discussed below). Each host entry may include any number of records associated with host components (e.g., 102, FIG. 1B), agents (e.g., 104, FIG. 1B), host component assets, and/or backups of host component data generated on the hosts. Each of the aforementioned components of the host may include a record that includes information associated with the component. Host components, agents, host component assets, and backups of host component data may be added, modified, and/or deleted from a host. Therefore, records associated with the aforementioned components may need to be removed from a host record repository and the data manager (120) may need to be notified to provide efficient data protection services for the hosts (100, FIG. 1A). The host record repository (126) may be used by the data manager (120) to perform data protection services for host components. The host record repository (126) may include other and/or additional information and may be used for other and/or additional purposes without departing from invention.

The persistent storage (124) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (124) may utilize portions of any combination of hard disk drives, solid state disk drives, tape drives, and/or any other physical storage medium of any number of computing devices.

Figure 2:
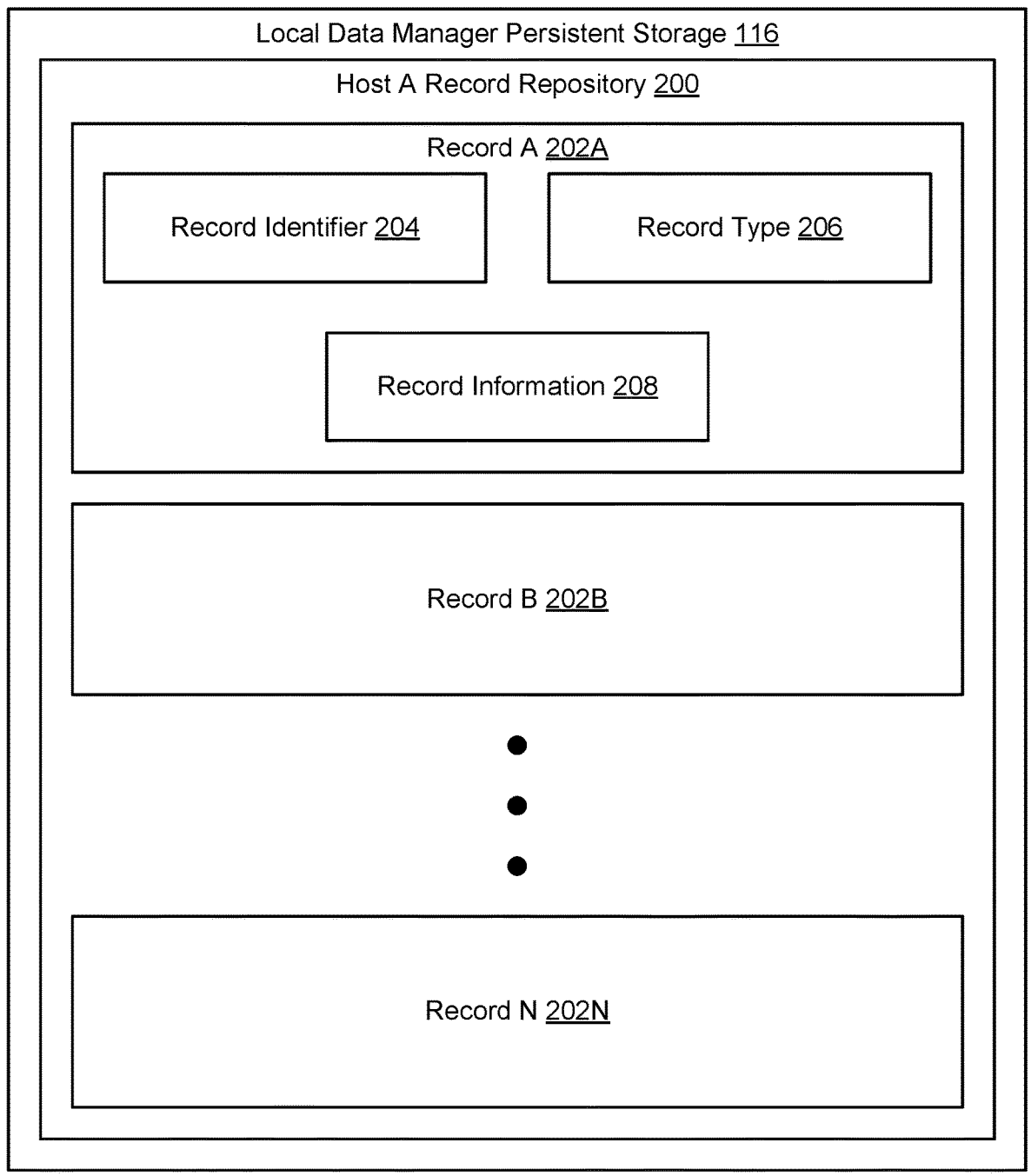
FIG. 2 shows a diagram of a local data manager persistent storage in accordance with one or more embodiments of the invention.

FIG. 2 shows a diagram of a local data manager persistent storage in accordance with one or more embodiments of the invention. The local data manager persistent storage (116) may be an embodiment of the local data manager persistent storage (116, FIG. 1B) discussed above. As discussed above, the local data manager persistent storage (116) may store a host A record repository (200). The host A record repository may be one or more data structures that include one or more records, e.g., record A (202A), record B (202B), and record N (202N), associated with a host (e.g., 100A). Each record (e.g., 202A) may include a record identifier (204) used to differentiate the record (e.g., 204), a record type (206), and record information (208). A record identifier (204) may refer to a unique, global combination of bits associated with a specific record. A record type (206) may refer to a unique combination of bits associated with a component type of the component to which the record is associated. The record types may include host component records, host component asset records, agent records, and/or backups of host component data.

The record information (208) may include any additional information associated with the component to which is associated with the record without departing from the invention. The record information (208) may include, for example, an identifier associated with the component (e.g., a host component identifier), topology of the component (e.g., a list of assets or instances of a host component), contents of a component (e.g., contents of a backup of host component data), and other and/or additional information regarding the component associated with the record without departing from the invention. The record information (208) may also include soft delete tags and hard delete tags. A soft delete tag may refer to a keyword or other indication and/or information that specifies that a record is soft deleted. The soft delete tag may also include a soft delete period, which may refer to a point in time which the soft delete tag expires, after which results in a local data manager tagging the record with a hard delete tag to hard delete the record. A hard delete tag may refer to a keyword or other indication and/or information that specifies that a record is hard deleted. The hard delete tag may also include a hard delete period, which may refer to a point in time which the hard delete tag expires, after which results in a local data manager deleting the record from the host A record repository (200).

Figure 3A:
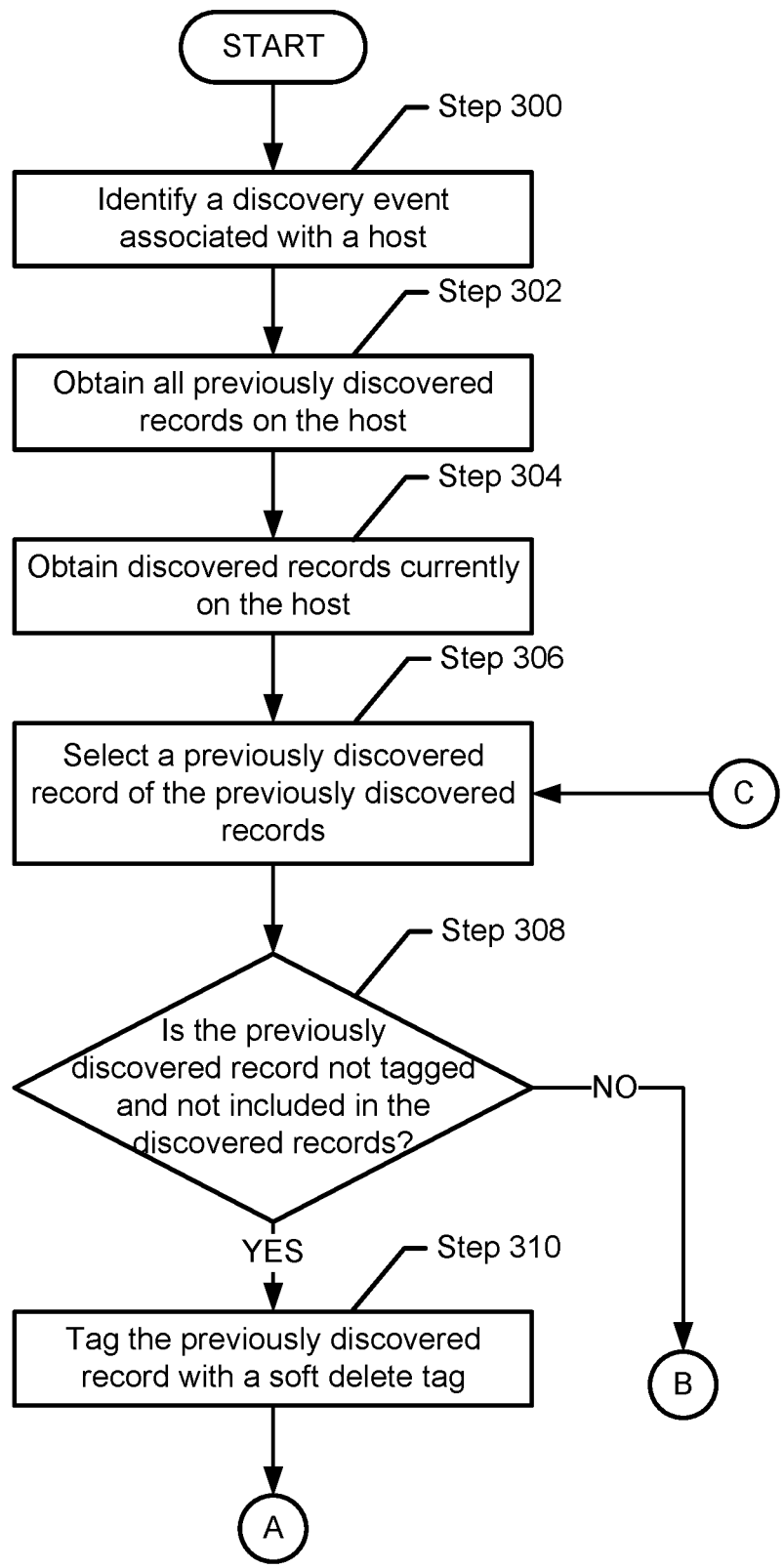
FIGS. 3A-3B show flowcharts of a method of managing records in accordance with one or more embodiments of the invention.
Figure 3B:
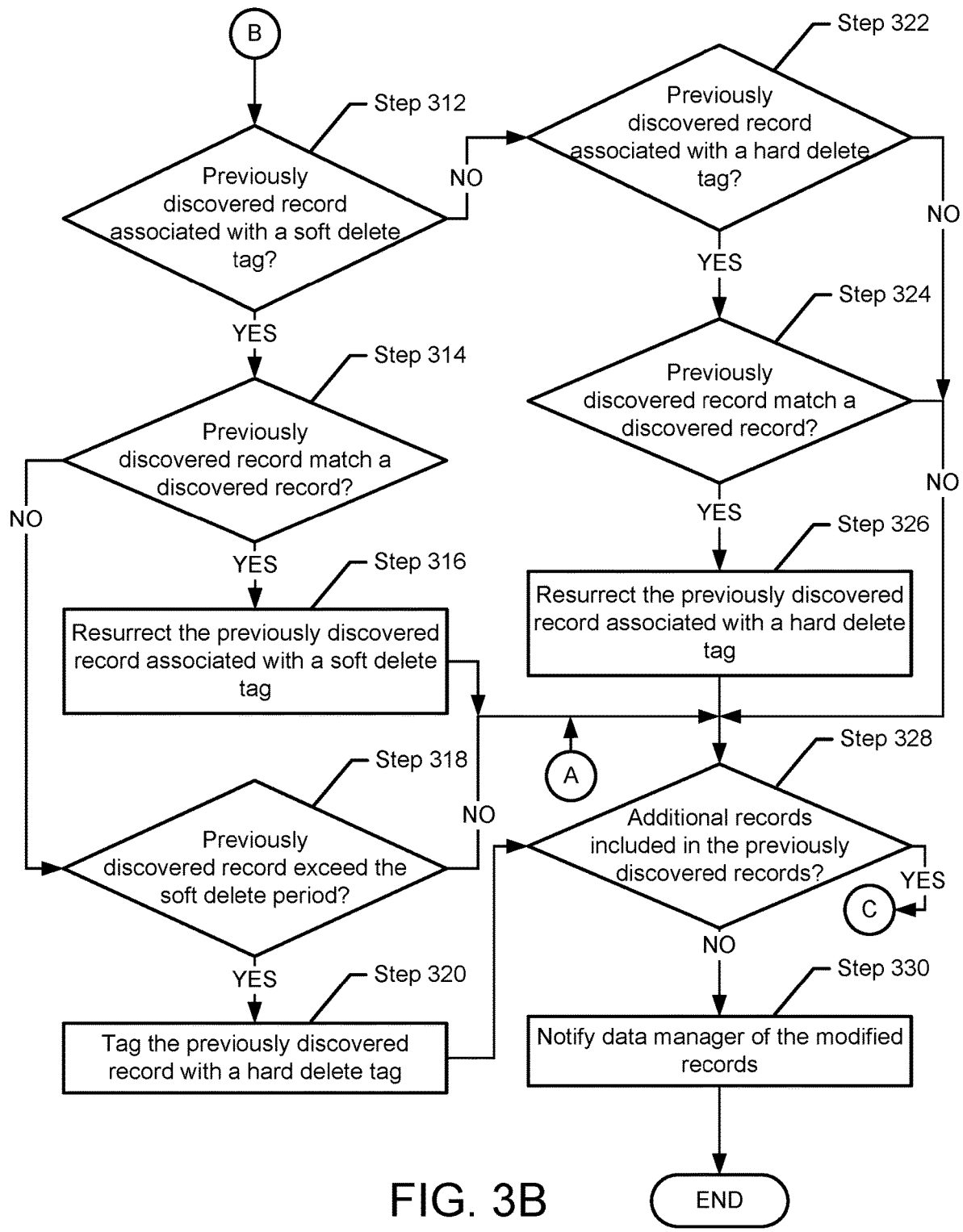

FIGS. 3A-3B show flowcharts of a method of managing records in accordance with one or more embodiments of the invention. The method shown in FIGS. 3A-3B may be performed by, for example, a local data manager (e.g., 110, FIG. 1B). Other components of the system illustrated in FIGS. 1A-1C may perform all or a portion of the method of FIGS. 3A-3B without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

Turning to FIG. 3A, in step 300, a discovery event associated with a host is identified. In one or more embodiments of the invention, the local data manager obtains a message from the data manager. The message may include a request to discover records on the host. The data manager may send the request to the local data manager in response to a request obtained from a user of the system or based on a discovery schedule specified by a protection policy that may specify when to discover records on a host. The message may specify the type of record to discover (i.e., host component record, host component asset record, etc.). The local data manager may identify obtaining the message as identifying the discovery event associated with the host. The discovery event associated with the host may be identified via other and/or additional methods without departing from the invention.

In step 302, all previously discovered records on the host are obtained. In one or more embodiments of the invention, the local data manager obtains a message from the data manager. In one or more embodiments of the invention, the previously discovered records are obtained by loading the previously discovered records into a cache storage of the local data manager memory. As discussed above, the host record repository may include all previously discovered records on the host. The local data manager may load all the previously discovered records included in the host record repository into a cache storage of the local data manager memory. All previously discovered records on the host may be obtained via other and/or additional methods without departing from the invention.

In step 304, discovered records currently on the host are obtained. In one or more embodiments of the invention, the previously discovered records are obtained by loading the previously discovered records into a cache storage of the local data manager memory. As discussed above, the host record repository may include all previously discovered records on the host. The local data manager may load all the previously discovered records included in the host record repository into a cache storage of the local data manager memory. All previously discovered records on the host may be obtained via other and/or additional methods without departing from the invention.

In step 306, a previously discovered record of the previously discovered records is selected. In one or more embodiments of the invention, the local data manager selects a previously discovered record included in the previously discovered records stored in the cache storage of the local data manager memory that has not previously been selected. The local data manager may select the first previously discovered record included in the previously discovered records stored in the cache storage of the local data manager memory that has not been previously selected. A previously discovered record of the previously discovered records may be selected via other and/or additional methods without departing from the invention.

In step 308, a determination is made as to whether the previously discovered record is not tagged and is not included in the discovered records. In one or more embodiments of the invention, the local data manager compares the previously discovered record with the discovered records to determine whether the previously discovered record is included in the discovered record. The local data manager may compare the record identifier of the previously discovered record with the record identifiers of each of the discovered records until a match is found or no match is found and all previously discovered records were compared against the discovered record. If the record identifier of the previously discovered record matches a record identifier of a discovered record, then the local data manager may determine that the previously discovered record is include in the discovered records. If the record identifier of the previously discovered record does not match a record identifier of any of the discovered records, then the local data manager may determine that the previously discovered record is not included in the discovered records. The local data manager may also search to previously discovered record to determine whether previously discovered record includes a hard delete tag or a soft delete tag. If the local data manager identifies a hard delete tag or a soft delete tag, then the local data manager may determine that the previously discovered record is tagged with a soft delete tag or a hard delete tag. If the local data manager does not identify a hard delete tag or a soft delete tag, then the local data manager may determine that the previously discovered record is not tagged with a soft delete tag or a hard delete tag. The determination as to whether the previously discovered record is included in the discovered records and not tagged may be determined via other and/or additional methods without departing from the invention.

If it is determined that the previously is not tagged and not included in the discovered records, then the method may proceed to step 310. If it is determined that the previously discovered record is tagged and/or included in the discovered records, then the method may proceed to step 312 of FIG. 3B.

In step 310, the previously discovered record is tagged with a soft delete tag. In one or more embodiments of the invention, the local data manager tags the previously discovered record stored in the host record repository with a soft delete tag by including the soft delete tag in the previously discovered record. After the previously discovered record is updated, the local data manager may delete the previously discovered record from the previously discovered records stored in the local data manager memory. The previously discovered record may be tagged with a soft delete tag via other and/or additional methods without departing from the invention.

The method may proceed to step 328 of FIG. 3B following step 310.

Turning to FIG. 3B, in step 312, a determination is made as to whether the previously discovered record is associated with a soft delete tag. In one or more embodiments of the invention, the local data manager checks the previously discovered record to determine if the previously discovered record includes a soft delete tag. As discussed above, a record may include a soft delete tag. If the local data manager finds a soft delete tag included in the previously discovered record, then the local data protection manager may determine that the previously discovered record includes a soft delete tag. If the local data manager does not find a soft delete tag included in the previously discovered record, then the local data manager may determine that the previously discovered record does not include a soft delete tag. The determination that whether the previously discovered record includes a soft delete tag may be determined via other and/or additional methods without departing from the invention.

If it is determined that the previously discovered record is associated with a soft delete tag, then the method may proceed to step 312. If it is determined that the previously discovered record is not associated with a soft delete tag, then the method may proceed to step 322.

In step 314, a determination is made as to whether the previously discovered record matches a discovered record. In one or more embodiments of the invention, the local data manager compares the previously discovered record with the discovered records to determine whether the previously discovered record matches a discovered record. The local data manager may compare the record identifier of the previously discovered record with the record identifiers of each of the discovered records until a match is found or no match is found and all previously discovered records were compared against the discovered record. If the record identifier of the previously discovered record matches a record identifier of a discovered record, then the local data manager may determine that the previously discovered record matches a discovered record. If the record identifier of the previously discovered record does not match a record identifier of any of the discovered records, then the local data manager may determine that the previously discovered record does not match a discovered record. The determination as to whether the previously discovered record matches a discovered record may be determined via other and/or additional methods without departing from the invention.

If it is determined that the previously discovered record matches a discovered record, then the method proceeds to step 316. If it is determined that the previously discovered record does not match a discovered record, then the method proceeds to step 318.

In step 316, the previously discovered record associated with the soft delete tag is resurrected. In one or more embodiments of the invention, the local data manager resurrects the previously discovered record by removing the soft delete tag from the previously discovered record in the host record repository stored in the local data manager persistent storage. After removing the soft delete tag, the local data protection manager may delete the previously discovered record from the previously discovered records included in the local data manager memory. The previously discovered record associated with the soft delete tag may be resurrected via other and/or additional methods without departing from the invention.

The method may proceed to step 328 following step 316.

In step 318, a determination is made as to whether the previously discovered record exceeds the soft delete period. In one or more embodiments of the invention, the local data manager checks the soft delete tag to determine whether the soft delete period exceeded. As discussed above, the soft delete tag may include the point in time in which the soft delete period will expire. The local data manager may compare the point in time in which the soft delete period expires with the current time (e.g., obtained from a real time clock). If the current time is earlier than the point in time in which the soft delete period will expire, then the local data manager may determine that the soft delete period is not exceeded. If the current time is later than the point in time in which the soft delete period will expire, then the local data manager may determine that the soft delete period is exceeded. The determination as to whether the soft delete period has expired may be made via other and/or additional methods without departing from the invention.

If it is determined that the previously discovered record exceeds the soft delete, then the method may proceed to step 320. If it is determined that the previously discovered record does not exceed the soft delete, then the method may proceed to step 328.

In step 320, the previously discovered record is tagged with a hard delete tag. In one or more embodiments of the invention, the local data manager tags the previously discovered record stored in the host record repository with a hard delete tag by including the hard delete tag in the previously discovered record. After the previously discovered record is updated, the local data manager may delete the previously discovered record from the previously discovered records stored in the local data manager memory. The previously discovered record may be tagged with a hard delete tag via other and/or additional methods without departing from the invention.

In step 322, a determination is made as to whether the previously discovered record is associated with a hard delete tag. In one or more embodiments of the invention, the local data manager checks the previously discovered record to determine if the previously discovered record includes a hard delete tag. As discussed above, a record may include a hard delete tag. If the local data manager finds a hard delete tag included in the previously discovered record, then the local data protection manager may determine that the previously discovered record includes a hard delete tag. If the local data manager does not find a hard delete tag included in the previously discovered record, then the local data manager may determine that the previously discovered record does not include a hard delete tag. The determination that whether the previously discovered record includes a hard delete tag may be determined via other and/or additional methods without departing from the invention.

If it is determined that the previously discovered record is associated with a hard delete tag, then the method may proceed to step 324. If it is determined that the previously discovered record is not associated with a hard delete tag, then the method may proceed to step 328.

In step 324, a determination is made as to whether the previously discovered record matches a discovered record. In one or more embodiments of the invention, the local data manager compares the previously discovered record with the discovered records to determine whether the previously discovered record matches a discovered record. The local data manager may compare the record identifier of the previously discovered record with the record identifiers of each of the discovered records until a match is found or no match is found and all previously discovered records were compared against the discovered record. If the record identifier of the previously discovered record matches a record identifier of a discovered record, then the local data manager may determine that the previously discovered record matches a discovered record. If the record identifier of the previously discovered record does not match a record identifier of any of the discovered records, then the local data manager may determine that the previously discovered record does not match a discovered record. The determination as to whether the previously discovered record matches a discovered record may be determined via other and/or additional methods without departing from the invention.

If it is determined that the previously discovered record matches a discovered record, then the method proceeds to step 326. If it is determined that the previously discovered record does not match a discovered record, then the method proceeds to step 328.

In step 326, the previously discovered record associated with the hard delete tag is resurrected. In one or more embodiments of the invention, the local data manager resurrects the previously discovered record by removing the hard delete tag from the previously discovered record in the host record repository stored in the local data manager persistent storage. After removing the hard delete tag, the local data protection manager may delete the previously discovered record from the previously discovered records included in the local data manager memory. The previously discovered record associated with the hard delete tag may be resurrected via other and/or additional methods without departing from the invention.

In step 328, a determination is made as to whether there are additional previously discovered records in the previously discovered records. In one or more embodiments of the invention, the local data manager checks the local data manager memory to determine whether an additional record is included in the previously discovered records. If a previously discovered record is included in the local data manager memory, then the local data manager may determine that an additional record is included in the previously discovered records. If a previously discovered record is not included in the local data manager memory, then the local data manager may determine that an additional record is not included in the previously discovered records. The determination as to whether an additional record is included in the previously discovered records may be determined via other and/or additional methods without departing from the invention.

If it is determined that an additional record is included in the previously discovered records, then the method may proceed to step 306 of FIG. 3A. If it is determined that an additional record is not included in the previously discovered records, then the method may proceed to step 330.

In step 330, the data manager is notified of the modified records. In one or more embodiments of the invention, the local data manager sends a message to the data manager to notify the data manager to the changes to the host record repository. The message may include the record identifiers associated resurrected records, the record identifiers associated with records tagged with soft delete tags, and the record identifiers associated with records tagged with hard delete tags. The data manager may be notified of the changed records via other and/or additional methods without departing from the invention.

The method may end following step 330.

Figure 3C:
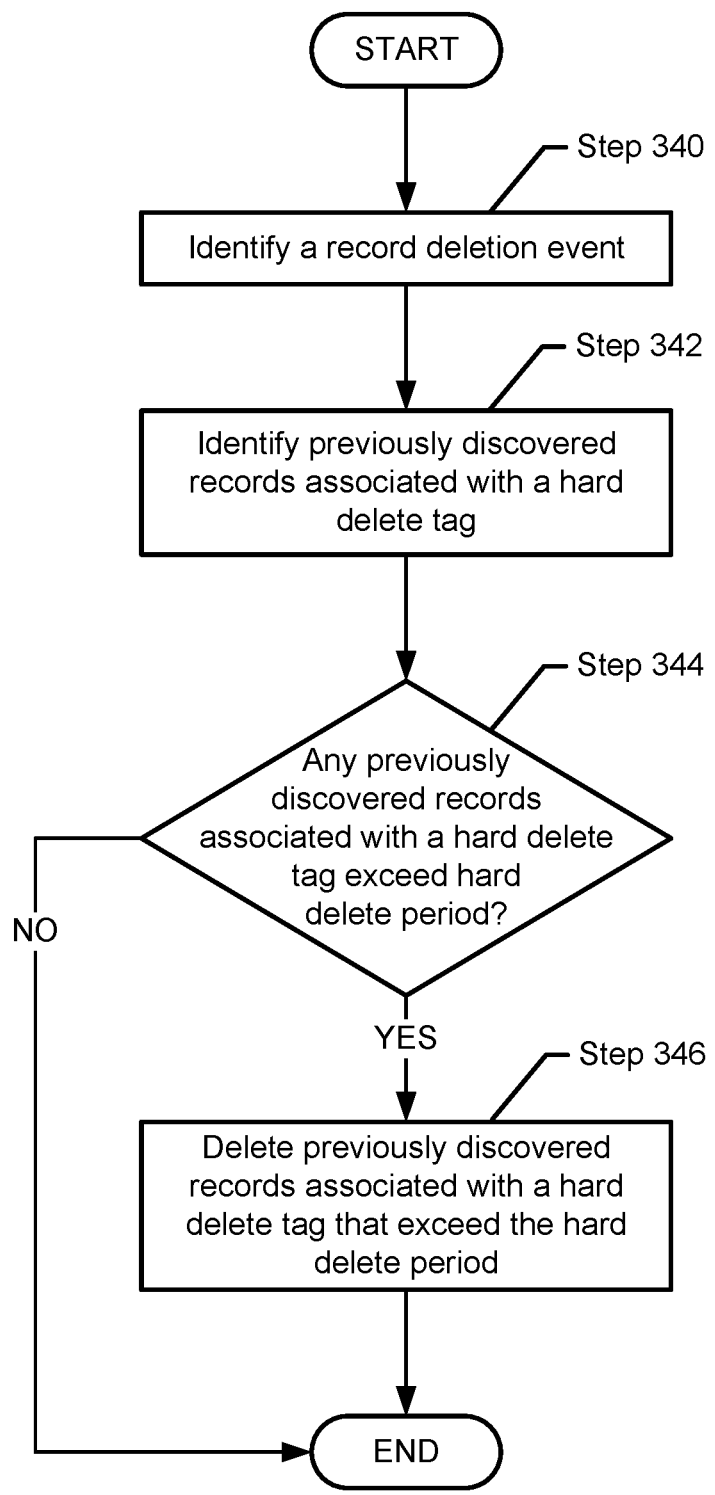
FIG. 3C shows a flowchart of a method of deleting records in accordance with one or more embodiments of the invention.

FIG. 3C shows flowchart of a method of deleting records in accordance with one or more embodiments of the invention The method shown in FIG. 3C may be performed by, for example, a local data manager (e.g., 110, FIG. 1B). Other components of the system illustrated in FIGS. 1A-1C may perform all or a portion of the method of FIG. 3C without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 340, a record deletion event is identified. In one or more embodiments of the invention, the local data manager obtains a message from the data manager. The message may include a request to delete records on the host. The data manager may send the request to the local data manager in response to a request obtained from a user of the system or based on a deletion schedule specified by a protection policy that may specify when to delete records on a host. The local data manager may identify obtaining the message as identifying the record deletion event. The record deletion event may be identified via other and/or additional methods without departing from the invention.

In step 342, previously discovered records associated with hard delete tags are identified. In one or more embodiments of the invention, the local data manager uses the host record repository to identify previously discovered records associated with hard delete tags. As discussed above, the host record repository includes all previously discovered records on a host, and each previously discovered record may include a hard delete tag. The local data manager may identify all previously discovered records included in the host record repository that include hard delete tags as the previously discovered records associated with hard delete tags. The previously discovered records associated with hard delete tags may be identified via other and/or additional methods without departing from the invention.

In step 344, a determination is made as to whether any of the previously discovered records associated with hard delete tags exceed the hard delete period. In one or more embodiments of the invention, the local data manager checks the hard delete tag of each identified previously discovered record to determine whether the hard delete periods for the previously discovered records are exceeded. As discussed above, the hard delete tag may include the point in time in which the hard delete period will expire. The local data manager may compare the point in time in which the hard delete period expires with the current time (e.g., obtained from a real time clock). If the current time is earlier than the point in time in which the hard delete period for all previously discovered records will expire, then the local data manager may determine that the hard delete periods of the previously discovered records are not exceeded. If the current time is later than the point in time in which the hard delete period will expire for any previously discovered records, then the local data manager may determine that the hard delete period is exceeded for at least one previously discovered record. The local data manager may make the aforementioned determination for each previously discovered record associated with a hard delete tag. The determination as to whether the hard delete period has expired may be made via other and/or additional methods without departing from the invention.

If it is determined that the hard delete periods of the previously discovered records are not exceeded, then the method may end following step 344. If it is determined that the hard delete period is exceeded for at least one previously discovered record, then the method may proceed to step 346.

In step 346, the previously discovered records associated with hard delete tags that exceed the hard delete period are deleted. In one or more embodiments of the invention, the local data manager deletes all previously discovered records associated with the expired hard delete periods from the host record repository in the local data manager persistent storage. After deleting the previously discovered record from the host record repository, the local data protection manager may notify the data protection manager of all the deleted records. The previously discovered records associated with the expired hard delete period may be deleted via other and/or additional methods without departing from the invention.

The method may end following step 346.

Example

Figure 4A:
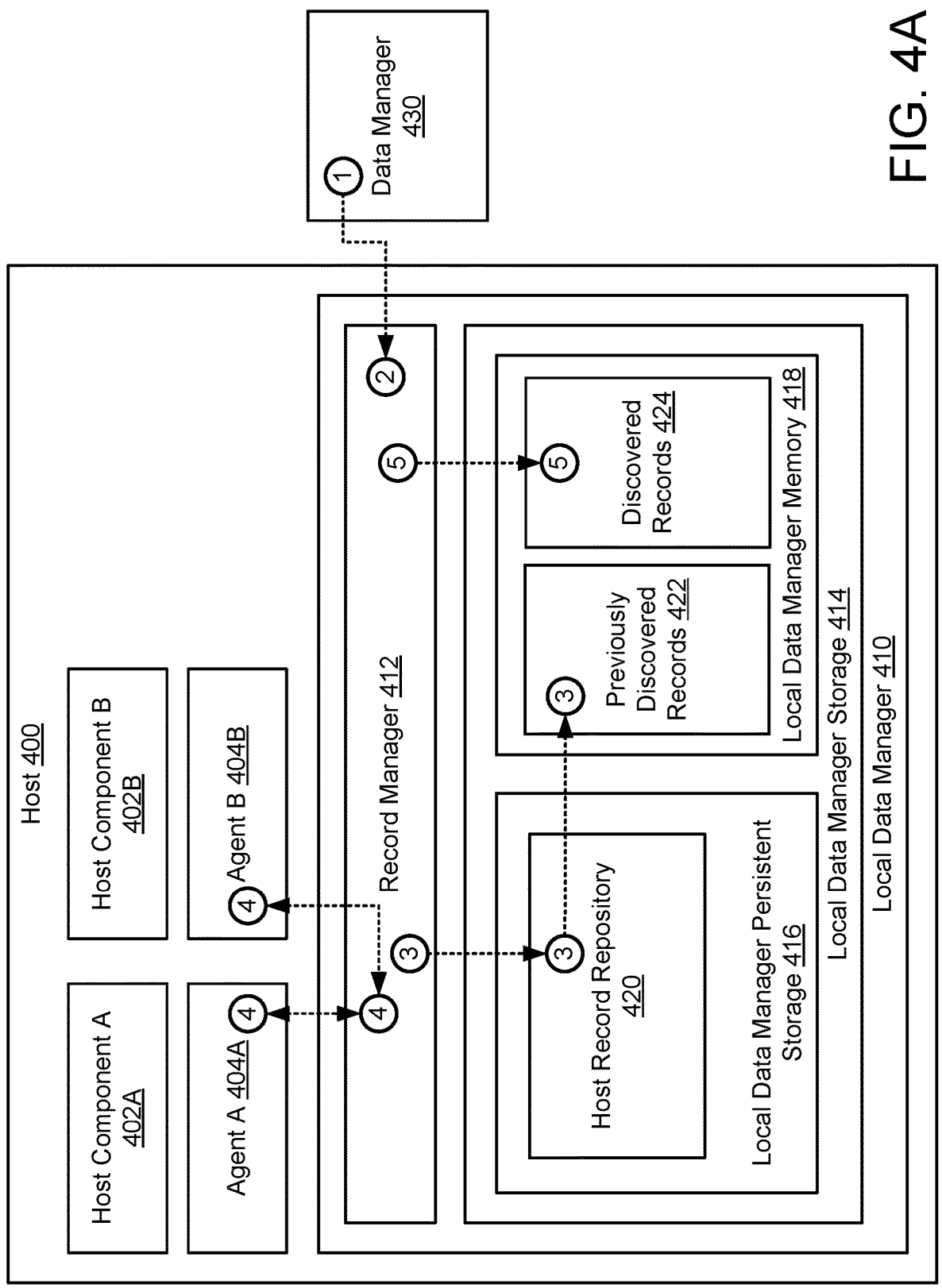
FIGS. 4A-4B show diagrams of the operation of a first example system over time in accordance with one or more embodiments of the invention.

FIGS. 4A-6B show diagrams of three operations of an example system in accordance with one or more embodiments of the invention. The examples are not intended to limit the invention. The example system depicted in FIGS. 4A-6B include fewer components than the system depicted in FIGS. 1A-1C for the sake of brevity. Turning to FIG. 4A, consider a scenario in which a data manager requests a local data manager to discover agent records currently on a host.

The example system of FIG. 4A includes a host (400) and a data manager (430). The host (400) includes two host components, host component A (402A) and host component B (402B), two agents, agent A (404A) and agent B (404B) and a local data manager (410). The local data manager (410) includes a record manager (412) and local data manager storage (414). The local data manager storage (414) includes local data manager persistent storage (416), which stores the host record repository (420), and local data manager memory (418).

At a first point in time, the data manager (430) obtains a request to discover changes in the records of agents of the host (400) [1]. The data manager (430) sends a request to record manager (412) of the local data manager (410) to discover changes in the records of the agents (e.g., 404A, 404B) of the host (400) [2]. The local data manager (410) identifies obtaining the request as a discovery event. In response to identifying the discovery event, the record manager (412) loads all of the previously discovered records (422) included in the host record repository in the local data manager memory (418) [3]. The record manager (412) then generates discovered records (424) associated with agent A (404A) and agent B (404B) [4]. After generating the discovered records (404), the record manager (412) loads the discovered records (424) into the local data manager memory [5].

Figure 4B:
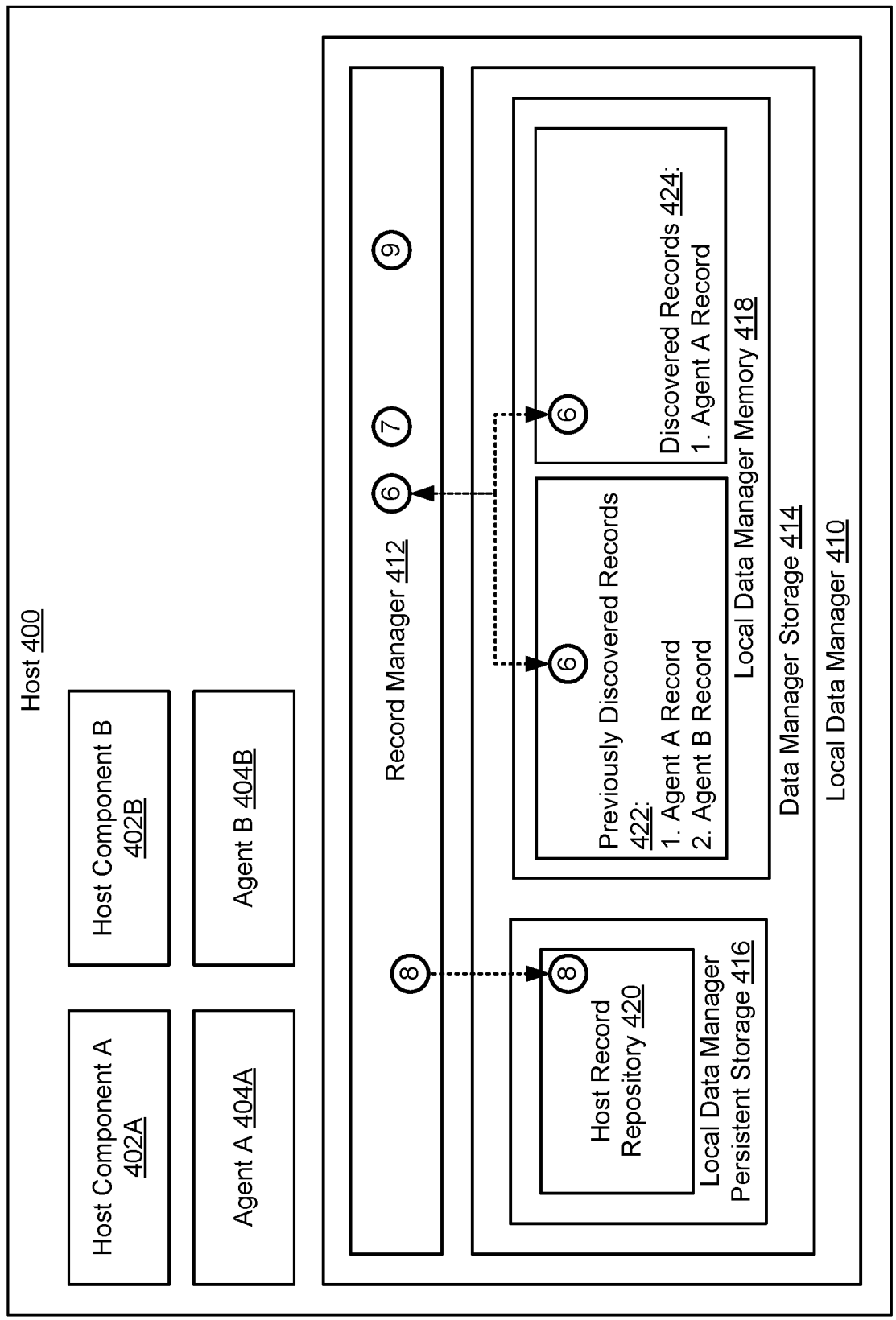

Turning to FIG. 4B, after loading the previously discovered records (422) and the discovered records (424) into the local data manager memory (418), the record manager (412) compares the previously discovered records (422) with the discovered records (424) [6]. In this case, the previously discovered records (422) include an agent A record and an agent B record and the discovered records (424) only includes an agent A record. The record manager (412) then determines that the agent B record is associated with an agent that has been removed from the host (400) [7]. Based on the determination, the record manager (412) updates the host record repository (420) to include a soft delete tag on previously discovered agent B record [8]. After the host record repository (420) is updated, the local data manager (410) sends a notification to the data manager (430, FIG. 4A) indicating that the agent B record was removed from the host (400) [9].

Figure 5A:
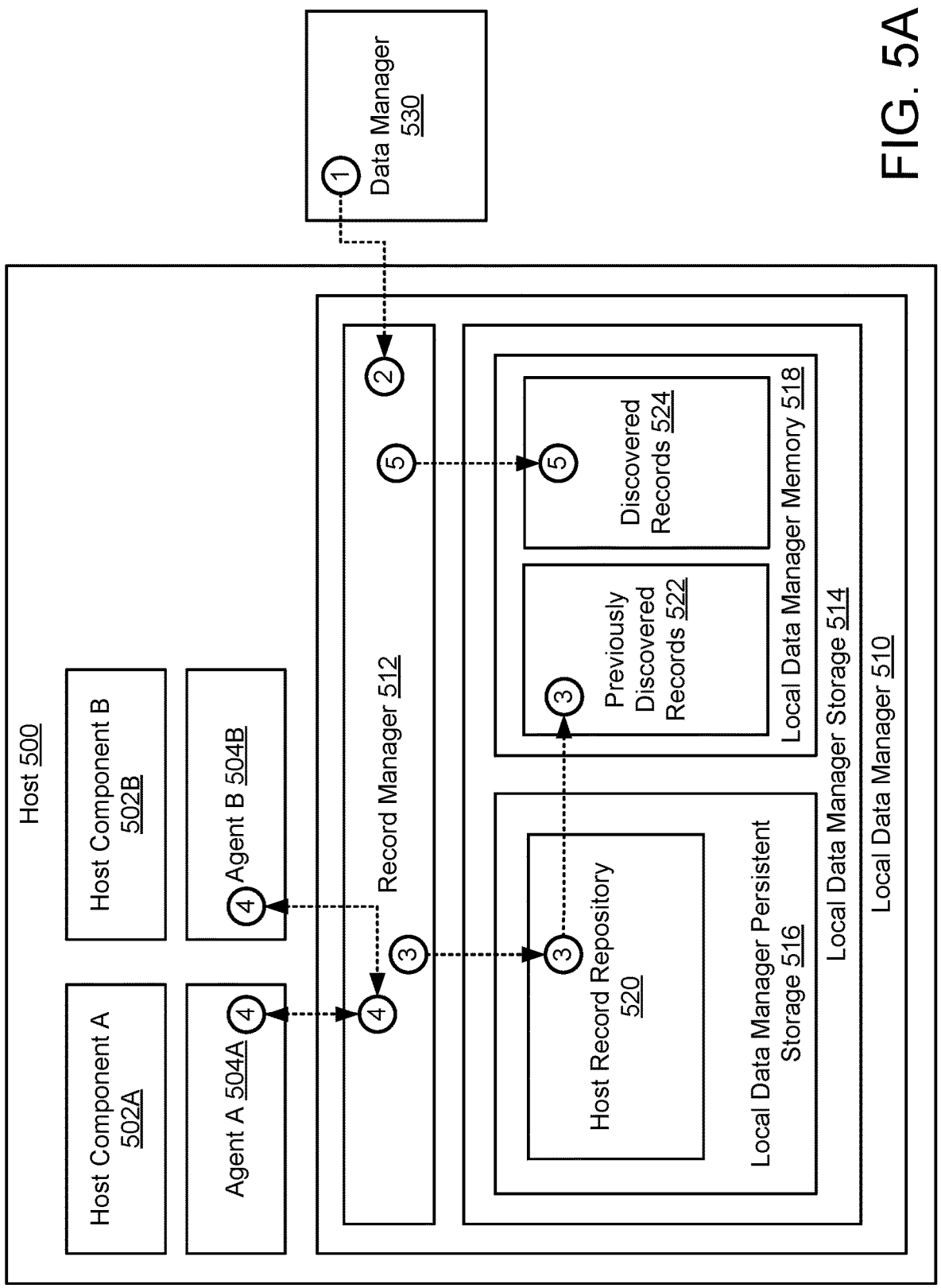
FIGS. 5A-5B show diagrams of the operation of a second example system over time in accordance with one or more embodiments of the invention.

Turning to FIG. 5A, consider a scenario in which a data manager requests a local data manager to discover host component asset records currently on a host.

The example system of FIG. 5A includes a host (500) and a data manager (530). The host (500) includes two host components, host component A (502A) and host component B (502B), two agents, agent A (504A) and agent B (504B) and a local data manager (510). The local data manager (510) includes a record manager (512) and local data manager storage (514). The local data manager storage (514) includes local data manager persistent storage (516), which stores the host record repository (520), and local data manager memory (518).

At a first point in time, the data manager (530) obtains a request to discover changes in the records of host component assets of the host (500) [1]. The data manager (530) sends a request to record manager (512) of the local data manager (510) to discover changes in the records of the host component assets of the host components (e.g., 502A, 502B) of the host (500) [2]. The local data manager (510) identifies obtaining the request as a discovery event. In response to identifying the discovery event, the record manager (512) loads all of the previously discovered records (522) included in the host record repository in the local data manager memory (518) [3]. The record manager (512) then generates discovered records (524) associated with a host component asset of host component A (502A) after obtaining record information from agent A (504A) and a host component asset of host component B (502B) after obtaining record information from agent B (504B) [4]. After generating the discovered records (524), the record manager (512) loads the discovered records (524) into the local data manager memory [5].

Figure 5B:
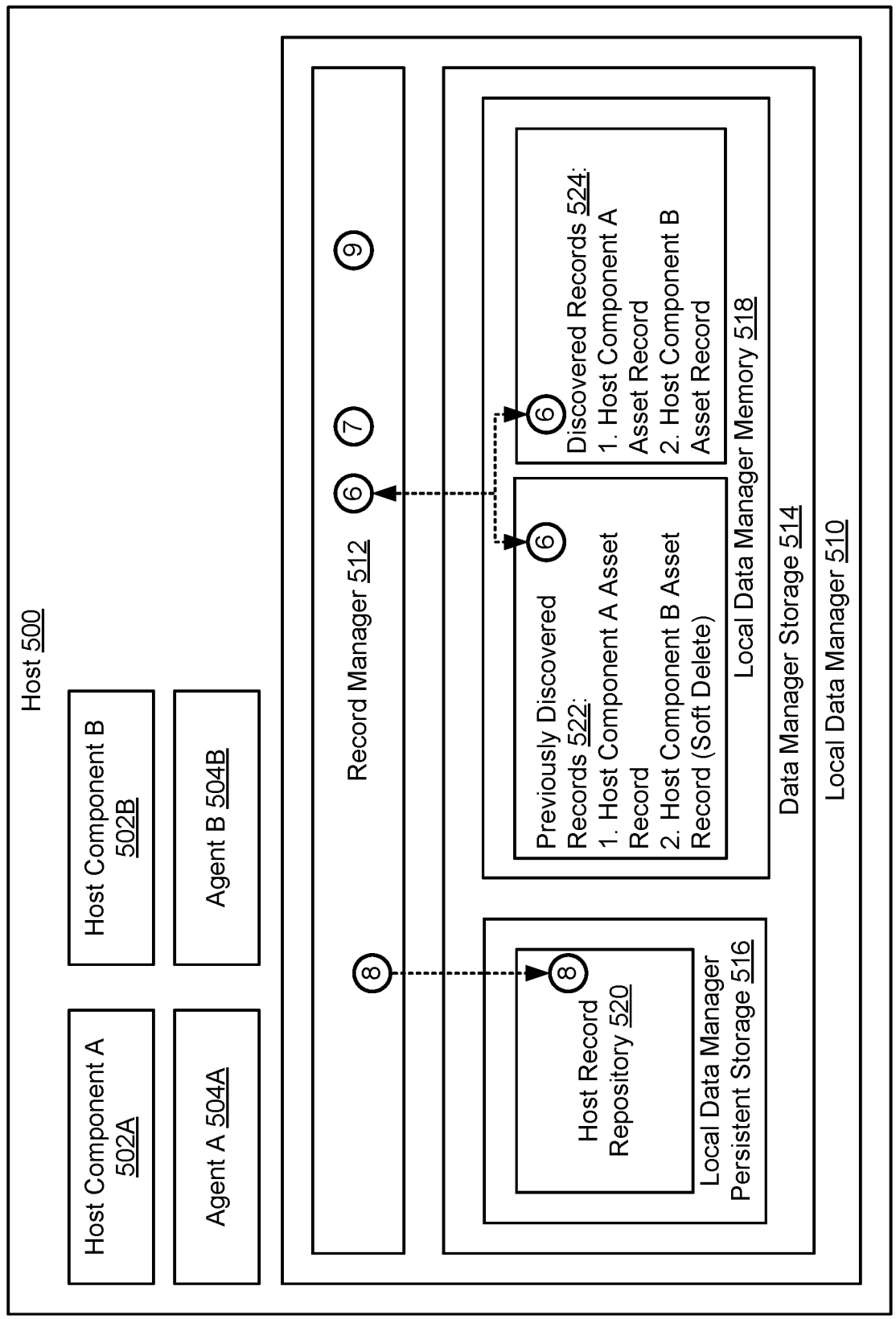

Turning to FIG. 5B, after loading the previously discovered records (522) and the discovered records (524) into the local data manager memory (518), the record manager (512) compares the previously discovered records (522) with the discovered records (524) [6]. In this case, the previously discovered records (522) includes the host component A asset record and the host component B asset record, where the host B asset record includes a soft delete tag. The discovered records (524) includes a host component A asset record and a host component B asset record. The record manager (512) determines that the host component B asset record was rediscovered on the host (500) [7]. Based on the determination, the record manager (512) updates the host record repository (520) to resurrect the host component asset B record by removing the soft delete tag [8]. After the host record repository (520) is updated, the local data manager (510) sends a notification to the data manager (530, FIG. 5A) indicating that the host component asset B record was resurrected on the host (500) [9].

Figure 6A:
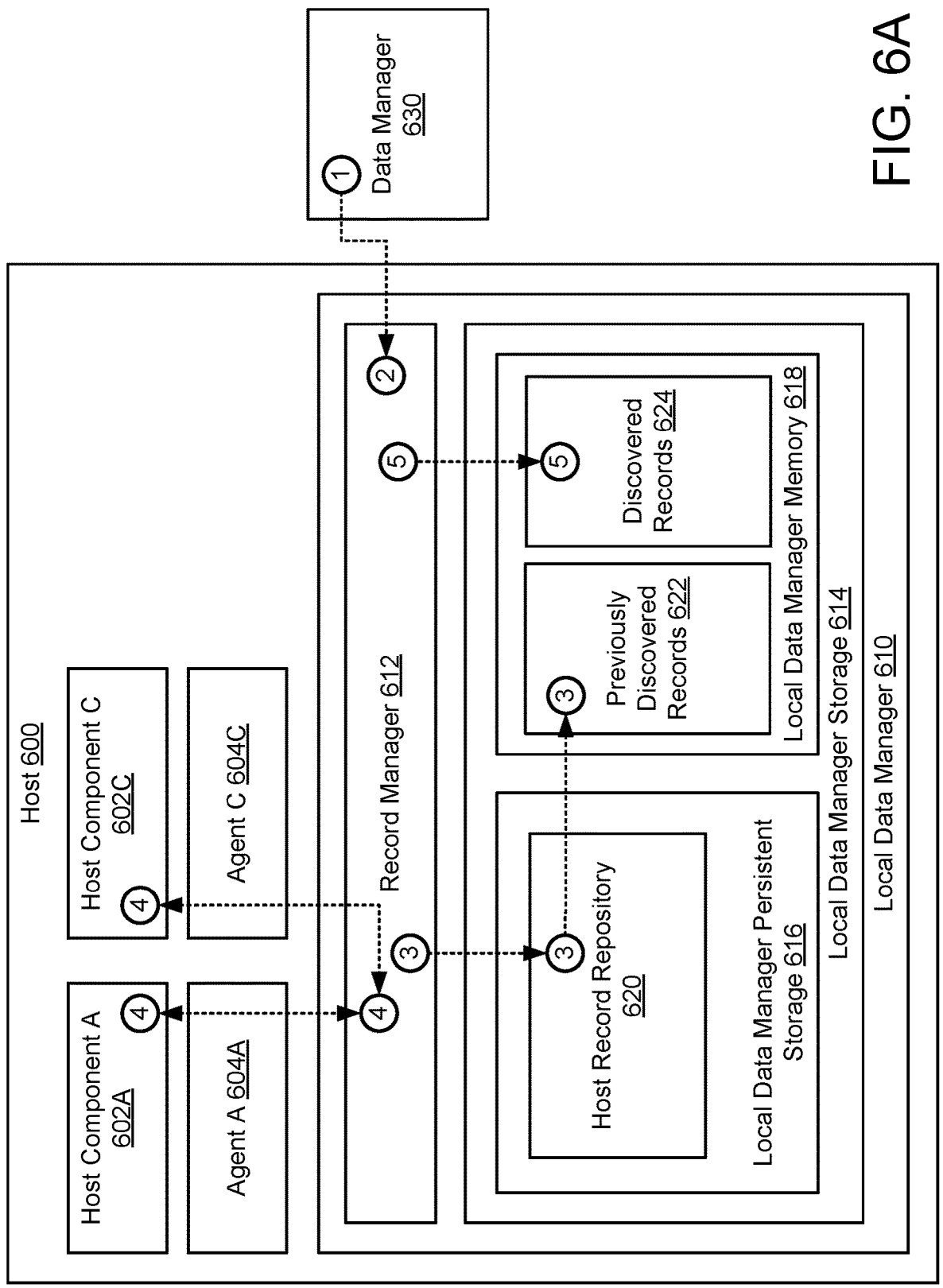
FIGS. 6A-6B show diagrams of the operation of a third example system over time in accordance with one or more embodiments of the invention.

Turning to FIG. 6A, consider a scenario in which a data manager requests a local data manager to discover host component records currently on a host.

The example system of FIG. 6A includes a host (600) and a data manager (630). The host (600) includes two host components, host component A (602A) and host component B (602B), two agents, agent A (604A) and agent B (604B) and a local data manager (610). The local data manager (610) includes a record manager (612) and local data manager storage (614). The local data manager storage (614) includes local data manager persistent storage (616), which stores the host record repository (620), and local data manager memory (618).

At a first point in time, the data manager (630) obtains a request to discover changes in the records of host components of the host (600) [1]. The data manager (630) sends a request to record manager (612) of the local data manager (610) to discover changes in the records of the host components (e.g., 602A, 602B) of the host (600) [2]. The local data manager (610) identifies obtaining the request as a discovery event. In response to identifying the discovery event, the record manager (612) loads all of the previously discovered records (622) included in the host record repository in the local data manager memory (618) [3]. The record manager (612) then generates discovered records (624) associated with host component A (602A) after obtaining record information from agent A (604A) and host component B (602B) after obtaining record information from agent B (604B) [4]. After generating the discovered records (624), the record manager (612) loads the discovered records (624) into the local data manager memory [5].

Figure 6B:
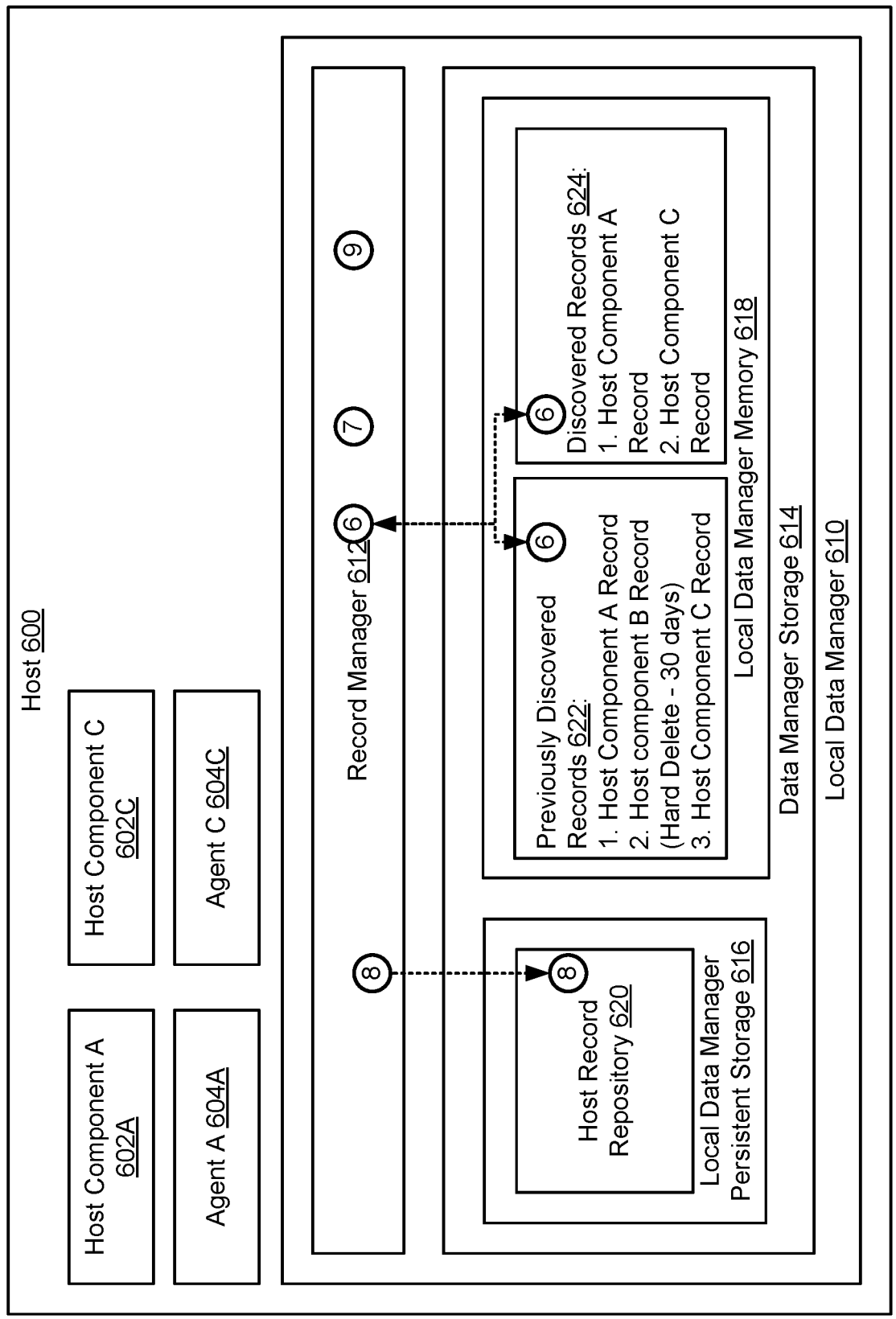

Turning to FIG. 6B, after loading the previously discovered records (622) and the discovered records (624) into the local data manager memory (618), the record manager (612) compares the previously discovered records (622) with the discovered records (624) [6]. In this case, the previously discovered records (622) includes a host component A record, a host component B record, which includes a hard delete tag that exceeds the hard delete period of 30 days, and a host component C record. The discovered records (624) include a host component A record and a host component C record. Based on this comparison, the discovered records do not include the host component B record. Therefore, the record manager (612) determines that host component B was removed from the host and not rediscovered prior to the end of the hard delete period [7]. Based on the determination, the record manager (612) updates the host record repository (620) to delete the host component B record [8]. After the host record repository (620) is updated, the local data manager (610) sends a notification to the data manager (630, FIG. 6A) indicating that the host component B record was deleted from the host (600) [9].

End of Example

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the reliability of managing record of hosts. Embodiments of the invention relate to tagging previously discovered records of various types of a host record repository that are not included in discovered records with soft delete tags and hard delete tags prior to deleting the previously discovered records from the host record repository. A previously discovered record tagged with a soft delete tag may be tagged with a hard delete tag after a configurable amount of time, and a previously discovered record tagged with a hard delete tag may be deleted from the host record repository after a configurable amount of time. Additionally, previously discovered records with soft delete tags and hard delete tags may be resurrected if the record is included in newly discovered records prior to deletion. This may improve the efficiency of managing records of hosts and may prevent accidental data loss associated with records that are temporarily removed from a host.

Thus, embodiments of the invention may address the problem of inefficient use of computing resources to identify and delete records of hosts in a system. This problem arises due to the technological nature of the environment in which the records are managed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A system for identifying and deleting records of hosts, comprising:
   local data manager persistent storage; and
   a local data manager executing on a host of the hosts programmed to:
      identify a discovery event associated with the host and a record type of record types, wherein the record types comprise at least host component records associated with host components executing on the host, agent records associated with agents executing on the host, asset records associated with assets of host components executing on the host, and backup records associated with backups of the assets;
      obtain, in response to identifying, all previously discovered records on the host associated with the record type from a host record repository, wherein a record of the host record repository comprises record information that specifies a host component identifier corresponding to a component of the host, a topology of the component, and contents of the component;
      obtain discovered records associated with the record type and associated with the host;
      after obtaining all discovered records and previously discovered records:
         select a first previously discovered record of the previously discovered records;
         make a first determination that the first previously discovered record does not match any discovered records of the discovered records and is not tagged with a soft delete tag or a hard delete tag; and in response to the first determination:
tag the first previously discovered record with the soft delete tag;
make a second determination that additional records are included in the previously discovered records; and
in response to the second determination:
select a second previously discovered record of the previously discovered records;
make a third determination that the second previously discovered record is associated with the soft delete tag and does not match any of the discovered records; and
in response to the third determination:
make a fourth determination that the second previously discovered record exceeds a soft delete period; and
in response to the fourth determination:
tag the second previously discovered record with the hard delete tag; and
notify a data manager of modifications to the previously discovered records.

2. The system of claim 1, wherein the local data manager is further programmed to:
after notifying the data manager of the modification to the previously discovered records:
identify a record deletion event;
identify previously discovered records associated with hard delete tags;
make a fifth determination that at least one of the previously discovered records associated with hard delete tags is associated with a second hard delete tag that exceeds a hard delete period; and
in response to the fifth determination:
delete the at least one previously discovered record.

3. The system of claim 1, wherein the host record repository comprises previously discovered records associated with the host, wherein the record is one of the previously discovered records.

4. The system of claim 3, wherein the record further comprises:
a record identifier; and
the record type.

5. The system of claim 1, wherein the soft delete period specifies an amount of time a given record is be tagged with the soft delete tag before it will be tagged with the hard delete tag.

6. The system of claim 2, wherein the hard delete period specifies an amount of time a given record is to be tagged with the hard delete tag before it will be deleted from the host record repository.

7. A method for identifying and deleting records of hosts, comprising:
identifying a discovery event associated with the host and a record type of record types, wherein the record types comprise at least host component records associated with host components executing on the host, agent records associated with agents executing on the host, asset records associated with assets of host components executing on the host, and backup records associated with backups of the assets;
obtaining, in response to identifying, all previously discovered records on the host associated with the record type from a host record repository, wherein a record of the host record repository comprises record information that specifies a host component identifier corresponding to a component of the host, a topology of the component, and contents of the component;
obtaining discovered records associated with the record type and associated with the host;
after obtaining all discovered records and previously discovered records:
selecting a first previously discovered record of the previously discovered records;
making a first determination that the first previously discovered record does not match any discovered records of the discovered records and is not tagged with a soft delete tag or a hard delete tag; and
in response to the first determination:
tagging the first previously discovered record with the soft delete tag;
making a second determination that additional records are included in the previously discovered records; and
in response to the second determination:
selecting a second previously discovered record of the previously discovered records;
making a third determination that the second previously discovered record is associated with the soft delete tag and does not match any of the discovered records; and
in response to the third determination:
making a fourth determination that the second previously discovered record exceeds a soft delete period; and
in response to the fourth determination:
tagging the second previously discovered record with the hard delete tag; and
notifying a data manager of modifications to the previously discovered records.

8. The method of claim 7, further comprising:
after notifying the data manager of the modification to the previously discovered records:
identifying a record deletion event;
identifying previously discovered records associated with hard delete tags;
making a fifth determination that at least one of the previously discovered records associated with hard delete tags is associated with a second hard delete tag that exceeds a hard delete period; and
in response to the fifth determination:
deleting the at least one previously discovered record.

9. A non-transitory computer readable medium comprising computer readable program code, which when executed by a computer processor enables the computer processor to perform a method for identifying and deleting records of hosts, the method comprising:
identifying a discovery event associated with the host and a record type of record types, wherein the record types comprise at least host component records associated with host components executing on the host, agent records associated with agents executing on the host, asset records associated with assets of host components executing on the host, and backup records associated with backups of the assets;
obtaining, in response to identifying, all previously discovered records on the host associated with the record type from a host record repository, wherein a record of the host record repository comprises record information that specifies a host component identifier corresponding to a component of the host, a topology of the component, and contents of the component;
obtaining discovered records associated with the record type and associated with the host;
after obtaining all discovered records and previously discovered records:
   selecting a first previously discovered record of the previously discovered records;
   making a first determination that the first previously discovered record does not match any discovered records of the discovered records and is not tagged with a soft delete tag or a hard delete tag; and
   in response to the first determination:
      tagging the first previously discovered record with the soft delete tag;
      making a second determination that additional records are included in the previously discovered records; and
      in response to the second determination:
         selecting a second previously discovered record of the previously discovered records;
         making a third determination that the second previously discovered record is associated with the soft delete tag and does not match any of the discovered records; and
         in response to the third determination:
            making a fourth determination that the second previously discovered record exceeds a soft delete period; and
            in response to the fourth determination:
               tagging the second previously discovered record with the hard delete tag; and
               notifying a data manager of modifications to the previously discovered records.

10. The non-transitory computer readable medium of claim 9, wherein the method further comprising:
   after notifying the data manager of the modification to the previously discovered records:
      identifying a record deletion event;
      identifying previously discovered records associated with hard delete tags;
      making a fifth determination that at least one of the previously discovered records associated with hard delete tags is associated with a second hard delete tag that exceeds a hard delete period; and
      in response to the fifth determination:
         deleting the at least one previously discovered record.

* * * * *